N. H. ANDERSON.
BALL RETAINER.
APPLICATION FILED JUNE 14, 1915.
1,201,791.
Patented Oct. 17, 1916.
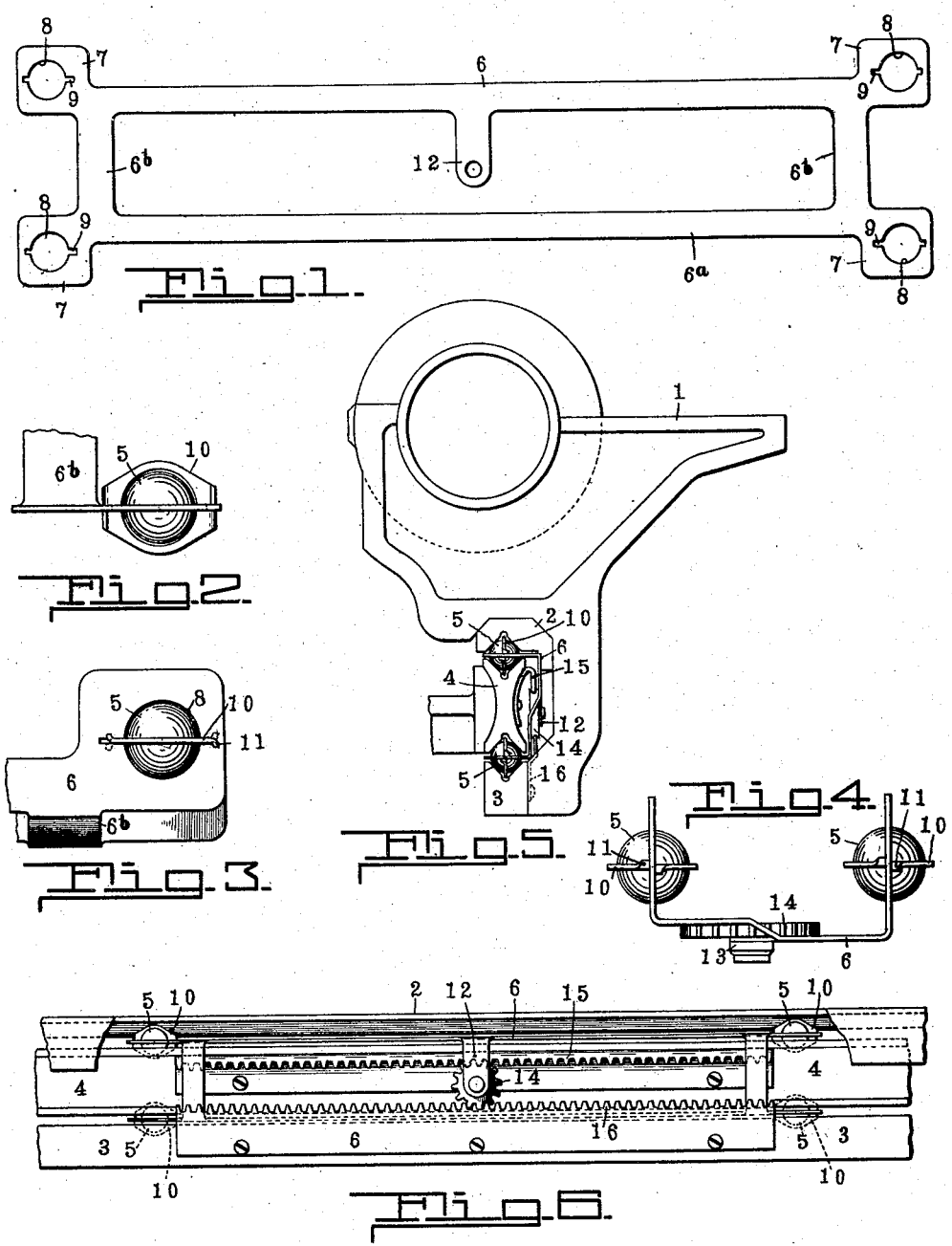

UNITED STATES PATENT OFFICE.

NILS H. ANDERSON, OF EAST HAMPTON, CONNECTICUT, ASSIGNOR TO THE NOISELESS TYPEWRITER COMPANY, OF MIDDLETOWN, CONNECTICUT, A CORPORATION OF CONNECTICUT.

BALL-RETAINER.

1,201,791.      Specification of Letters Patent.      Patented Oct. 17, 1916.

Original application filed May 14, 1910, Serial No. 561,416. Patent No. 1,163,966, dated December 14, 1915. Divided and this application filed June 14, 1915. Serial No. 33,893.

*To all whom it may concern:*

Be it known that I, NILS H. ANDERSON, a citizen of the United States, residing at the town of East Hampton, in the county of Middlesex and State of Connecticut, have invented certain new and useful Improvements in Ball-Retainers, of which the following is a full, clear, and exact description, such as will enable others skilled in the art to which it appertains to make and use the same.

This invention relates to ball retainers, and more particularly to such devices employed in friction-reducing bearings.

This application is a division of my application filed May 14, 1910 and issued December 14, 1915 as Patent No. 1,163,966.

One of the objects of the invention is to provide an improved ball retainer comprising few parts capable of cheap manufacture and easy assembly.

A further object is to provide a simple and efficient device of the above character which may be handled as a unit and readily associated with other mechanism.

Other objects and advantages will be in part obvious and in part appear hereinafter in connection with the following description of a typical embodiment of the invention illustrated in the accompanying drawing, wherein a ball retainer is shown associated with certain parts of a typewriter mechanism.

In the drawings,—Figure 1 is a plan view of a stock blank from which the retainer is formed; Fig. 2 is a front view of one of the ball holders; Fig. 3 is a bottom view thereof; Fig. 4 is an end view of the retainer; Fig. 5 is a similar view of the same, mounted in a typewriter with the balls employed to reduce friction between relatively moving parts; and Fig. 6 is a rear view thereof.

As illustrated, a typewriter carriage 1 is provided with spaced guide rails 2 and 3 arranged to travel longitudinally of an intermediate supporting rail 4. The adjacent surfaces of these rails are provided with V-shaped runways to accommodate a plurality of friction-reducing balls 5.

Referring more specifically to the drawing, there is pivoted a ball retainer 6 which serves to maintain the bearings 5 in proper spaced relation and to facilitate assembly thereof in the machine. This retainer preferably comprises an open metal stamping of substantial rectangular shape, with enlarged corner portions 7 and longitudinal connecting strips 6$^a$ and transverse strips 6$^b$. The corner portions 7 are each provided with a circular opening 8 to receive one of the balls 5 and with short slots or recesses 9 on opposite sides of said apertures and parallel to the strip 6$^a$. Apertured keepers 10, also of flat stamped metal, are provided to complete the caging of the balls 5 by the retainer. Each of the keepers is of a length to perpendicularly enter the retainer openings 8 and slots 9, and the keeper ends are medially slitted to provide forks 11 (Fig. 3) which may be offset in opposite directions after positioning the keeper to engage opposite sides of the retainer corners 7 and thereby hold the keepers perpendicularly in place. The openings 8 in the retainer support 6 and the openings in the keepers 10 are equi-dimensional and in registry whereby the balls 5 are substantially caged, though it will be observed that the balls may be readily removed, if desired, by merely straightening the ends 11 of the keepers and withdrawing the same through the retainer slots 9.

In the form of the device illustrated the retainer strips 6$^a$ and corners 7 are bent into parallel relation at right angles to the transverse strip 6$^b$, so that a U-shaped frame is provided to embrace the typewriter rail 4 with the balls 5 in the upper and lower grooves thereof. In this embodiment, also, the retainer has an integral depending tongue 12 to which is secured a sleeve or bushing 13 (Fig. 4) having a pinion 14 provided to mesh on opposite sides with a fixed rack 15 and a movable rack 16 on the carriage. By this arrangement the retainer 6 and balls 5 travel with the carriage 1 but at a fractional speed thereof, so that the bearings are maintained in the proper relation with respect to the carriage throughout longitudinal movement of the latter.

Having described my invention, what I claim as new and desire to secure by Letters Patent is:

1. A skeleton retainer comprising a support having a bearing element receiving aperture, and a keeper angularly penetrating said support and removably secured thereto.

2. A retainer comprising a flat support having an aperture, a bearing element in said opening, and a flat keeper encircling said bearing and secured to said support in an angular relation.

3. A retainer comprising a support having bearing element receiving openings, a slit adjacent each opening, an apertured keeper having a forked portion adapted to engage said support on opposite sides of said slit, and a bearing element caged within the openings of said keeper and said support.

4. A retainer comprising a flat support, a flat keeper perpendicularly penetrating said support and having bent portions to engage opposite sides of the same, said parts having equi-dimensional openings in registry, and a bearing element caged in said openings.

5. The combination with a flat bearing element retainer having an opening, of a member disposed perpendicularly of the plane of said opening and removably secured to said retainer for holding a spherical bearing element in said opening.

6. As an article of manufacture, a blank for a bearing element retainer comprising a substantially rectangular frame of sheet metal having corner portions to be bent at an angle to the body portion, each of said corner portions being provided with an opening to receive a bearing element, and an opening to receive a keeper.

7. As an article of manufacture, a blank for a bearing element retainer having enlarged corner portions, each of said portions having a bearing element receiving opening, and a slit at each side of said opening parallel to the length of said retainer.

In testimony whereof I affix my signature, in the presence of two witnesses.

NILS H. ANDERSON.

Witnesses:
ELBERT O. HULL,
C. M. NEWMAN.

Copies of this patent may be obtained for five cents each, by addressing the "Commissioner of Patents, Washington, D. C."